(12) United States Patent
Chen et al.

(10) Patent No.: US 8,843,561 B2
(45) Date of Patent: Sep. 23, 2014

(54) COMMON CLUSTER MODEL FOR CONFIGURING, MANAGING, AND OPERATING DIFFERENT CLUSTERING TECHNOLOGIES IN A DATA CENTER

(75) Inventors: Ming Chen, Markham (CA); Thomas J. Lumpp, Reutlingen (DE); Markus Mueller, Eutingen (DE); Juergen P. Schneider, Althenesttlt (DE); Andrew N. Trossman, North York (CA)

(73) Assignee: International Business Machines Corporation, Armonk, NY (US)

( * ) Notice: Subject to any disclaimer, the term of this patent is extended or adjusted under 35 U.S.C. 154(b) by 830 days.

(21) Appl. No.: 12/622,297

(22) Filed: Nov. 19, 2009

(65) Prior Publication Data
US 2010/0064009 A1 Mar. 11, 2010

Related U.S. Application Data

(63) Continuation of application No. 11/117,137, filed on Apr. 28, 2005, now abandoned.

(51) Int. Cl.
*G06F 15/16* (2006.01)
*H04L 29/08* (2006.01)
*G06F 9/50* (2006.01)

(52) U.S. Cl.
CPC .......... *G06F 9/5061* (2013.01); *H04L 67/1002* (2013.01); *H04L 67/1029* (2013.01)
USPC ........................................................ 709/205

(58) Field of Classification Search
USPC ................................................. 709/201, 205
See application file for complete search history.

(56) References Cited

U.S. PATENT DOCUMENTS

| | | | |
|---|---|---|---|
| 4,731,860 A | 3/1988 | Wahl | |
| 4,837,831 A | 6/1989 | Gillick et al. | |
| 6,338,112 B1 | 1/2002 | Wipfel et al. | |
| 6,438,705 B1 * | 8/2002 | Chao et al. | 714/4 |
| 6,826,568 B2 | 11/2004 | Bernstein et al. | |
| 6,854,069 B2 | 2/2005 | Kampe et al. | |
| 7,139,925 B2 | 11/2006 | Dinker et al. | |
| 2001/0056461 A1 | 12/2001 | Kampe et al. | |
| 2002/0042693 A1 | 4/2002 | Kampe et al. | |
| 2003/0041138 A1 | 2/2003 | Kampe et al. | |
| 2003/0214525 A1 | 11/2003 | Esfahany | |

(Continued)

OTHER PUBLICATIONS

Fakhouri et al., "Active Middleware Services in a Decision Support System for Managing Highly Available Distributed Resources", J. Sventek and G. Coulson (Eds.): Middleware 2000, LNCS 1795, 2000, pp. 349-371.

(Continued)

*Primary Examiner* — Noel Beharry
(74) *Attorney, Agent, or Firm* — Yee & Associates, P.C.; Jeffrey S. LaBaw

(57) ABSTRACT

A method, apparatus, and computer instructions are provided for a common cluster model for configuring, managing, and operating different clustering technologies in a data center. The common cluster model supports peer cluster domains and management server cluster domains. Each cluster domain may have one or more cluster nodes. For each cluster domains, one or more cluster resources may be defined. These resources may depend on one another and may be grouped into a resource group. A set of cluster domain and cluster resources logical device operations are provided to configure, manage, and operate cluster domains and its associated resources.

15 Claims, 8 Drawing Sheets

(56) References Cited

U.S. PATENT DOCUMENTS

2004/0153708 A1* 8/2004 Joshi et al. .................. 714/4
2004/0205148 A1* 10/2004 Bae et al. .................... 709/213
2005/0171752 A1* 8/2005 Patrizio et al. ............... 703/17
2008/0216082 A1 9/2008 Eilam et al.

OTHER PUBLICATIONS

Jain et al., "Data Clustering: A Review", ACM Computing Surveys, vol. 31, No. 3, Sep. 1999, pp. 264-323.

Bhargava et al., "Improving Dynamic Cluster Assignment for Clustered Trace Cache Processors", Electrical and Computer Engineering Department, The University of Texas at Austin, 2003, 11 pages.

McCallum et al., "Efficient Clustering of High-Dimensional Data Sets with Application to Reference Matching", Boston, Massachusetts, 2000, pp. 169-178.

Meek et al., "The Learning-Curve Sampling Method Applied to Model-Based Clustering", Journal of Machine Learning Research 2 (2002) pp. 397-418.

Zhong et al., "A Unified Framework for Model-based Clustering", Journal of Machine Learning Research 4 (2003) pp. 1001-1037.

* cited by examiner

ClusterDomain LDOs
900

* ClusterDomain.Config(in ClusterDomainID, in FirstClusterNodeID, inout FirstClusterNodeName, in isFirstNodeAdmin, in SecondClusterNodeID, inout SecondClusterNodeName, in isSecondNodeAdmin, inout ObservedState, inout DesiredState, inout FirstNodeObservedState, inout FirstNodeDesiredState, inout SecondNodeObservedState, inout SecondNodeDesiredState) — 902
* ClusterDomain.AddNode(in ClusterDomainID, in ClusterNodeID, inout ClusterNodeName, inout ObservedState, inout DesiredState, out MasterClusterNodeName, out MasterClusterNodeObservedState) — 904
* ClusterDomain.Start(in ClusterDomainID, out ObservedState) — 906
* ClusterDomain.Stop(in ClusterDomainID, out ObservedState) — 908
* ClusterDomain.StartNode(in ClusterDomainID, in ClusterNodeID, out ObservedState, out DesiredState) — 910
* ClusterDomain.StopNode(in ClusterDomainID, in ClusterNodeID, out ObservedState, out DesiredState) — 912
* ClusterDomain.Remove(in ClusterDomainID) — 914
* ClusterDomain.RemoveNode(in ClusterDomainID, in ClusterNodeID, out MasterClusterNodeName, out MasterClusterNodeObservedState) — 916
* ClusterDomain.CreateResource(in ClusterDomainID, in ClusterResourceGroupID, in DcmObjectResourceID, in array ClusterNodeIDs, inout ClusterResourceName, inout ClusterResourceType, inout array ClusterResourceAttributeNames, inout array ClusterResourceAttributeValues, out array ClusterResourceIDs, out array ObservedStates, out array DesiredStates) — 918
* ClusterDomain.CreateResourceGroup(in ClusterDomainID, in GroupName, in ParentGroupID, in ChildGroupID, in array ClusterNodeIDs, out ObservedState, out ClusterResourceGroupID) — 920
* ClusterDomain.UpdateDomainStatus(in ClusterDomainID, out ObservedState) — 922
* ClusterDomain.UpdateNodeStatus(in ClusterDomainID, in ClusterNodeID, out ObservedState) — 924

CLUSTER RESOURCE LDOs
930

* ClusterResource.Start(in ClusterResourceID, out ObservedState) — 932
* ClusterResource.Stop(in ClusterResourceID, out ObservedState) — 934
* ClusterResource.AddGroupMember(in ResourceGroupID, in AggregateMemberID) — 936
* ClusterResource.CreateDependency(in ClusterResourceID, in TargetClusterResourceID, in DependencyName, in Dependency, out ResourceDependencyID) — 938
* ClusterResource.Update(in ClusterResourceID, in ClusterResourceGroupID, in array ClusterResourceAttributeNames, in array ClusterResourceAttributeValues) — 940
* ClusterResource.RemoveResource(in ClusterResourceID) — 942

*FIG. 9*

//  COMMON CLUSTER MODEL FOR CONFIGURING, MANAGING, AND OPERATING DIFFERENT CLUSTERING TECHNOLOGIES IN A DATA CENTER

This application is a continuation of application Ser. No. 11/117,137, filed Apr. 28, 2005, status allowed.

BACKGROUND OF THE INVENTION

1. Technical Field

The present invention relates to a data processing system. In particular, the present invention relates to modeling clustering technologies in a data center. Still more particularly, the present invention relates to providing a common cluster model for configuring, managing, and operating different clustering technologies in a data center.

2. Description of Related Art

In a data center, a variety of clustering technologies may be used to configure, manage, and operate clusters. Examples of these clustering technologies include Veritas™ clustering server, which is available from Veritas Software Corporation, Tivoli® System Automation (TSA) for Multiplatforms and WebSphere, which is available from International Business Machines Corporation, and Microsoft® cluster server available from Microsoft Corporation.

These clustering technologies each have their own way to configure, manage, and operate clusters. For example, Veritas clustering server provides a configuration definition template for configuring a Veritas cluster. TSA cluster uses a pre-camp policy and a CLI cluster command to configure the TSA cluster. Microsoft cluster server uses configuration user interface to configure the cluster and encapsulate all detail configuration steps from the users. The WebSphere cluster uses a deployment manager server to configure a WebSphere Application Server (WAS) cluster by calling a WAS internal application programming interface (API). With the variety of ways to configure, manage, and operate cluster, no mechanism is present that allows users to easily interact with different clustering technologies.

In addition, these clustering technologies each have their own data model for modeling the cluster. When encountering different clustering technologies, users have to have knowledge of different data models associated with each of these clustering technologies. For example, if both a WAS cluster and a TSA high availability cluster are used in a data center, a user must handle these two clustering technologies and their data models separately.

Therefore, it would be advantageous to have an improved method that operates different clustering technologies and understands different data models.

SUMMARY OF THE INVENTION

The present invention provides a method, an apparatus, and computer instructions for a common cluster model for configuring, managing, and operating different clustering technologies in a data center. The common cluster model defines a cluster domain that includes at least one cluster node for a clustering technology, associates at least one cluster resource with the cluster domain or the at least one cluster node, and associates at least one property with the cluster domain or the at least one cluster resource.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 9 is a diagram illustrating exemplary cluster domain logical device operations and cluster resource logical device operations in accordance with an illustrative embodiment of the present invention.

DETAILED DESCRIPTION OF THE PREFERRED EMBODIMENT

Figure 1:
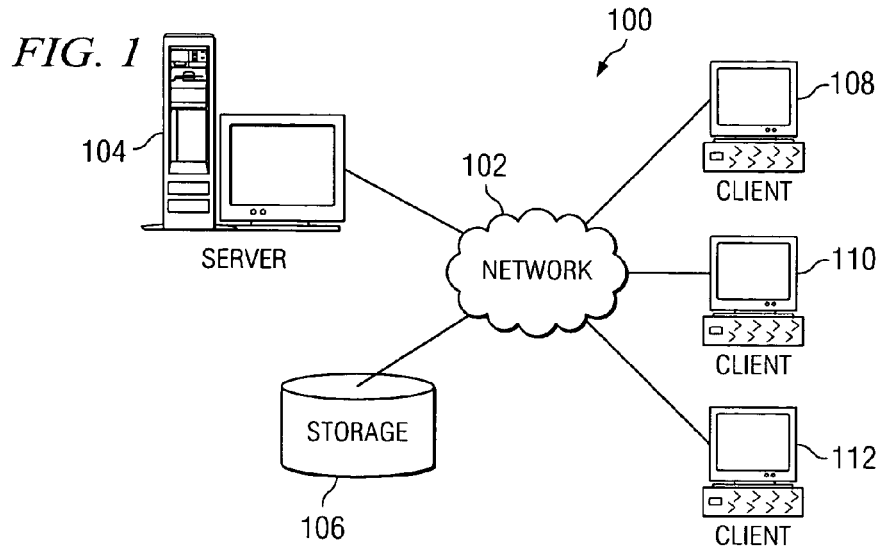
FIG. 1 depicts a pictorial representation of a network of data processing systems in which an illustrative embodiment of the present invention may be implemented.

With reference now to the figures, FIG. 1 depicts a pictorial representation of a network of data processing systems in which an illustrative embodiment of the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
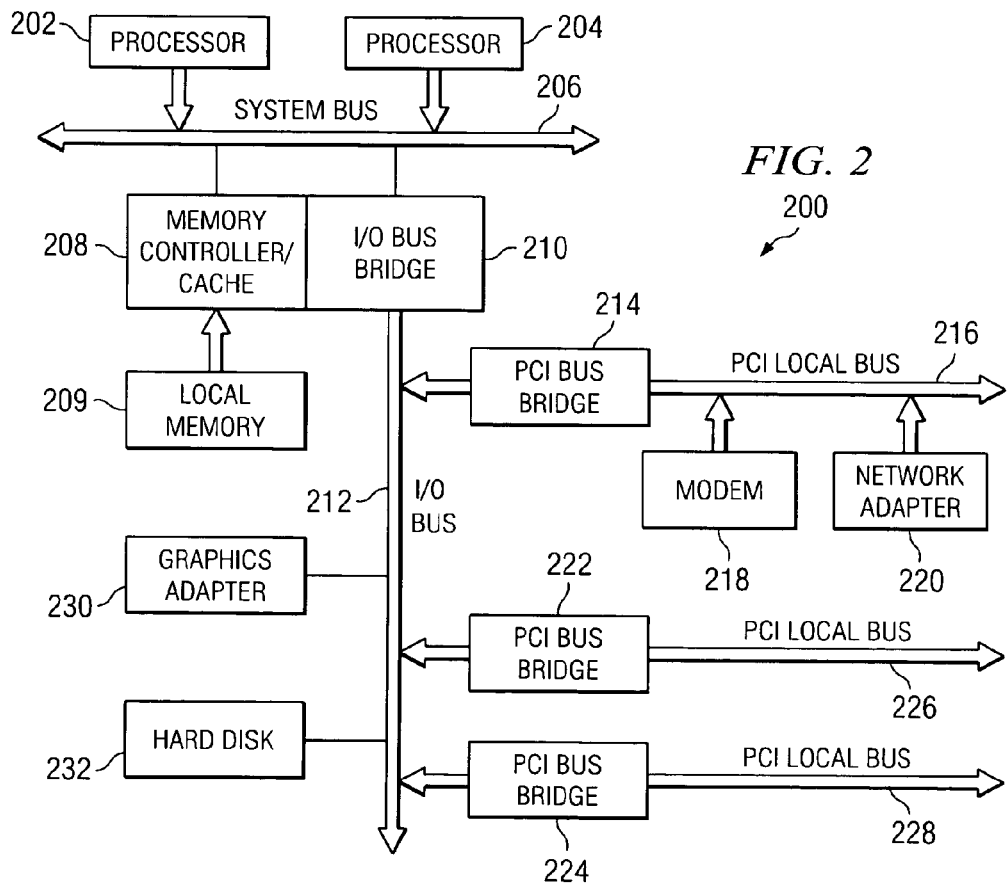
FIG. 2 is a block diagram of a data processing system that may be implemented as a server, in accordance with an illustrative embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or the LINUX operating system.

Figure 3:
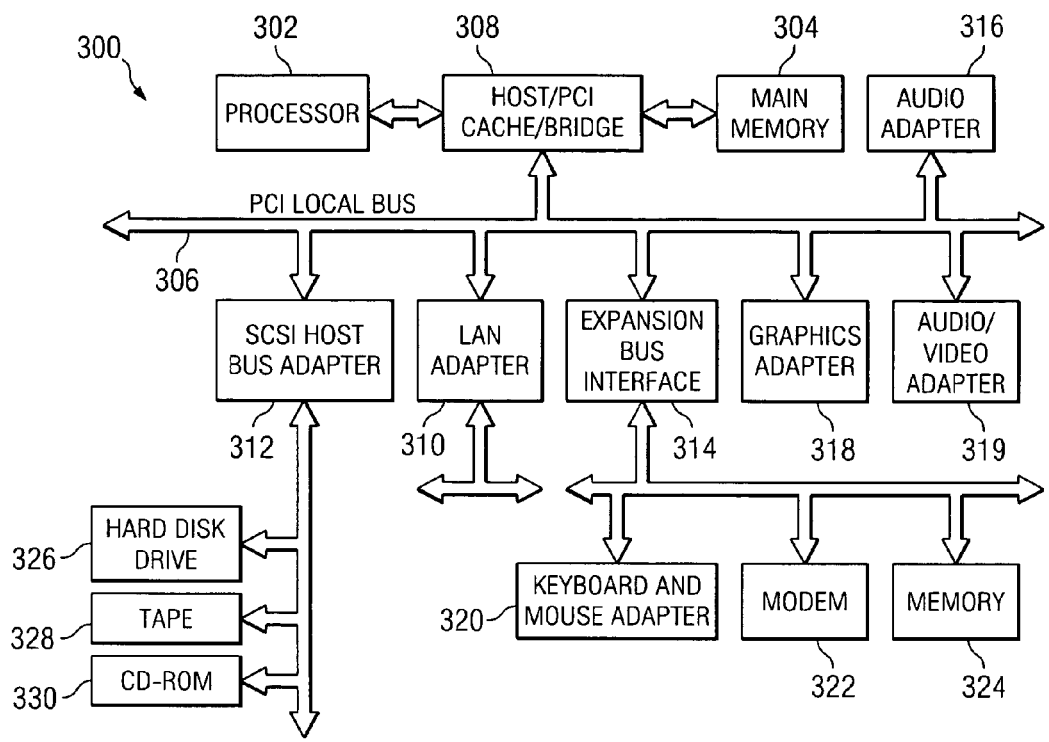
FIG. 3 is a block diagram of a data processing system in which an illustrative embodiment of the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302. Those of ordinary skill in the art will recognize that computer usable storage media other than hard disk drives 326 and main memory 304 may contain instructions.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
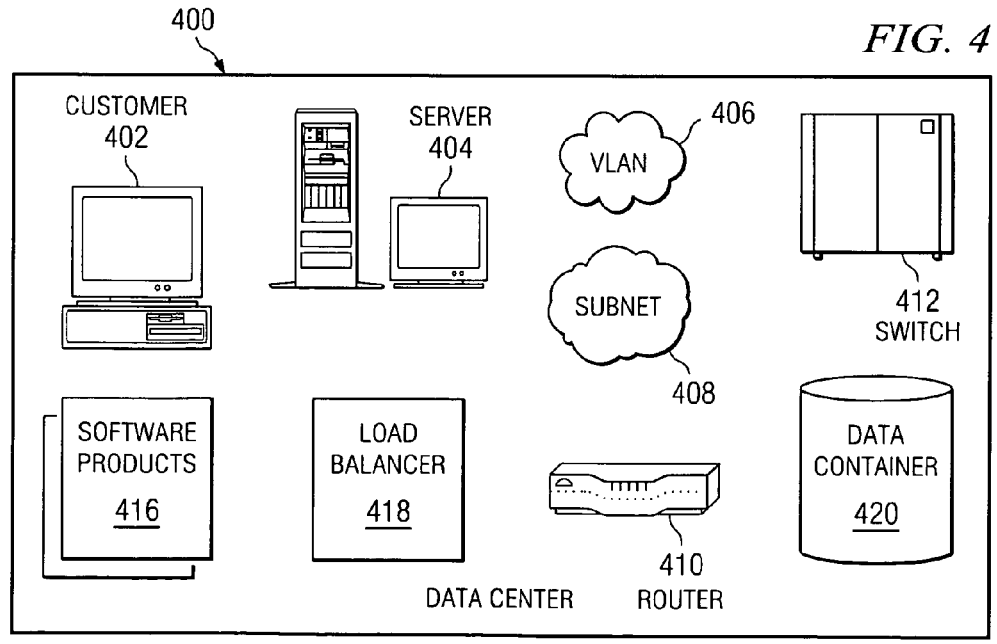
FIG. 4 is a diagram illustrating an exemplary data center, in accordance with an illustrative embodiment of the present invention.

Turning now to FIG. 4, a diagram illustrating an exemplary data center is depicted, in accordance with a preferred embodiment of the present invention. As shown in FIG. 4, in this illustrative example, data center 400 includes resources, such as, customer 402, server 404, Virtual Local Area Network (VLAN) 406, subnet 408, router 410, switch 412, software products 416, load balancer 418, and data container 420.

Customer 402 may be, for example, a client or an administrator who uses a data processing system, such as data processing system 300 in FIG. 3. Server 404 may be implemented as a data processing system, such as data processing system 200 in FIG. 2. Server 404 may also be implemented as an application server, which hosts Web services, or other types of servers. Router 410 and switch 412 facilitate communications between different devices. VLAN 406 is a network of computers that behave as if they are connected to the same wire even though they may actually be physically located on different segments of a local area network. Subnet 408 is a portion of a network, which may be a physically independent network segment and shares a network address with other portions of the network.

Software products 416 are applications that may be deployed to a client or a server. Load balancer 418 spreads traffic among multiple systems such that no single system is overwhelmed. Load balancer 418 is normally implemented as software running on a data processing system. Data container 420 may be a database, such as DB2 Universal Database, a product available from International Business Machines Corporation.

Data center 400, as depicted in FIG. 4, is presented for purposes of illustrating the present invention. Other resources, such as, for example, cluster of servers and switch port, also may be included in data center 400. The mechanism of the present invention provides a common cluster model for configuring, managing and operating clusters, such as clusters of servers 404, in a data centers, such as data center 400. The processes of the present invention may be performed by a processing unit comprising one or more processors, such as processor 302 in FIG. 3, using computer implemented instructions, which may be located in a memory such as, for example, main memory 304, memory 324, or in one or more peripheral devices 326 and 330.

Figure 5:
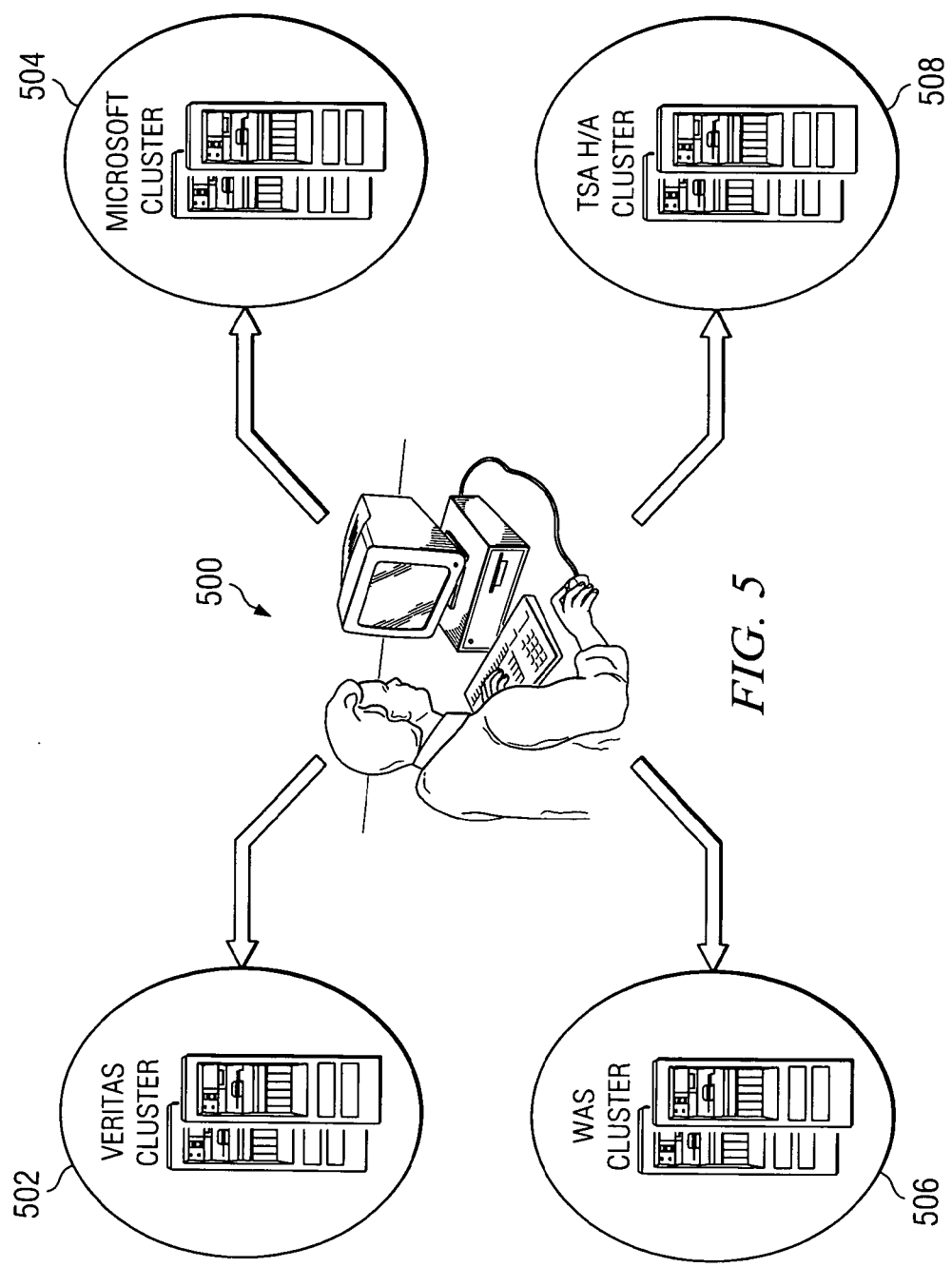
FIG. 5 is a diagram illustrating a known method to configure, manage, and operate a cluster.

Turning now to FIG. 5, a diagram illustrating a known method to configure, manage, and operate a cluster is depicted. As shown in FIG. 5, currently, administrator 500 configures, manages, and operates different clustering technologies in different ways. For example, administrator configures Veritas cluster 502 and its resources using Veritas configuration files and agents.

In another example, administrator 500 configures Microsoft cluster 504 and its resources using MS cluster configuration user interface or Windows scripts. Similarly, administrator 500 uses WebSphere API to configure WAS cluster 506. In yet another example, administrator 500 configures TSA HA cluster 508 and its pre-camp policy using TSA specific command, such as CLI.

Figure 6:
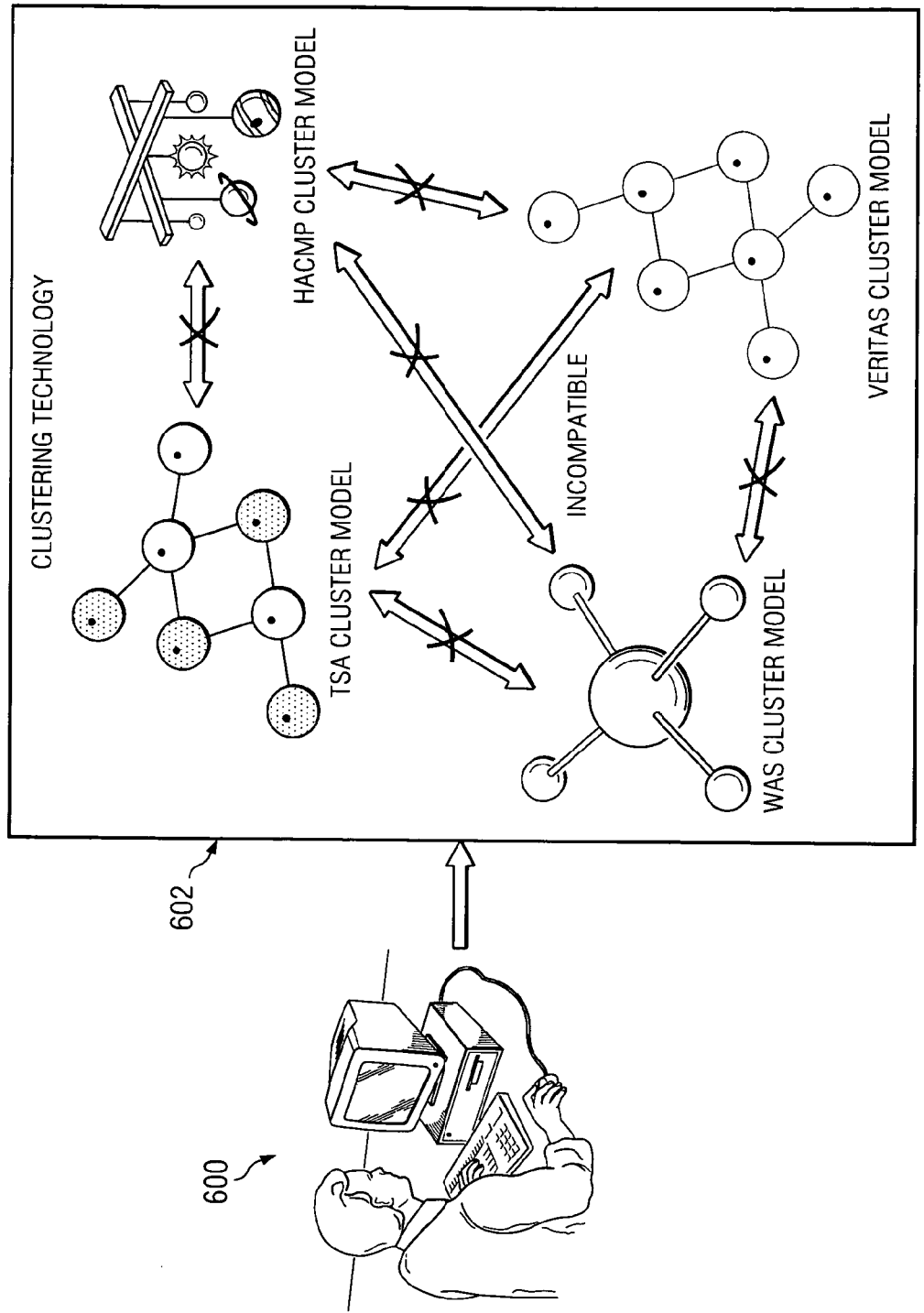
FIG. 6 is a diagram illustrating known relationships between different clustering technologies.

Turning now to FIG. 6, a diagram illustrating known relationships between different clustering technologies is depicted. As shown in FIG. 6, administrator 600 currently has to handle different clustering technologies 602 individually, since clustering technologies 602 are incompatible with one another. Therefore, a need exists for a common model that handles different clustering technologies.

In an illustrative embodiment, the present invention provides such common model, known as common cluster model, which configures, manages, and operates a cluster regardless of which clustering technology the cluster employs. The common cluster model allows a user to interact with the vendor specific clustering technology without knowledge of the specific clustering technology or its data model.

The common cluster model is a common interface between the user and a plurality of logical device operations. The logical device operations map the common cluster model into specific device driver workflows which interact with various vendor specific clustering technologies. Thus, the common cluster model provides a higher level of abstraction for cluster administrators to configure, manage, and operate the data center where different clustering technologies are applied.

Figure 7:
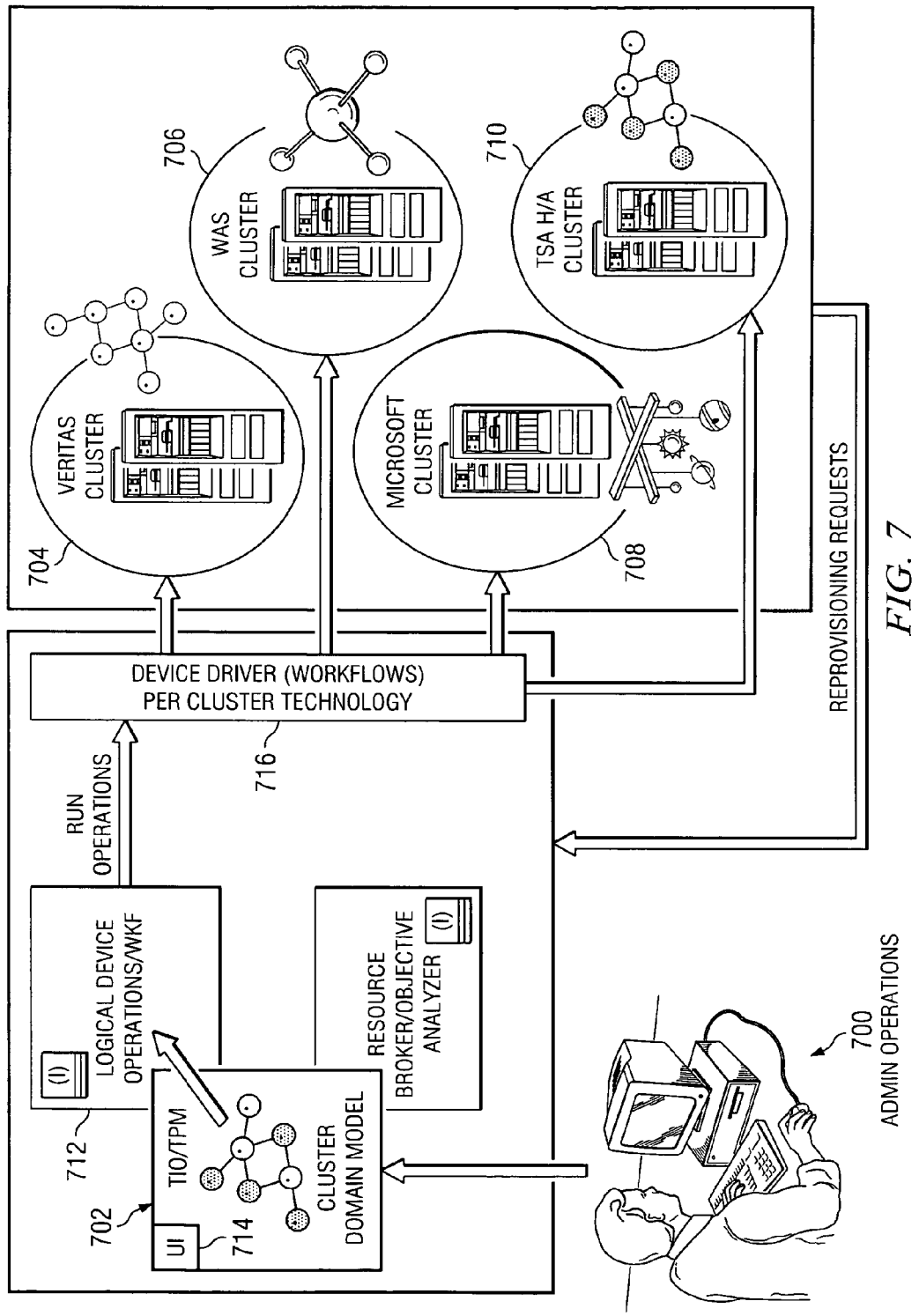
FIG. 7 is a diagram illustrating relationships between administrators and different clustering technologies in accordance with an illustrative embodiment of the present invention.

Turning now to FIG. 7, a diagram illustrating relationships between administrators and different clustering technologies is depicted in accordance with an illustrative embodiment of the present invention. As shown in FIG. 7, administrator 700 is different from administrator 500 and 600 in FIGS. 5 and 6 in that administrator 700 interacts with common cluster model 702 instead of vendor specific clustering technologies, such as Veritas cluster 704, WAS cluster 706, Microsoft cluster 708, and TSA HA cluster 710.

With common cluster model 702 provided by the present invention, administrator 700 may invoke logical device operations 712 via graphical user interface 714. Logical device operations 712 allow administrator 700 to configure, manage, and operate vendor specific clustering technologies 704-710 using device driver workflows 716.

Examples of operations administrator 700 may perform via common cluster model 702 include configuring a cluster, adding node to a cluster, removing a node from a cluster, starting or stopping a cluster, starting or stopping a cluster node, creating and deleting a cluster resource, creating and deleting a resource group, synchronizing cluster or resource states, starting or stopping a cluster resource, updating a resource, and creating or updating resource dependencies.

In an illustrative embodiment, common cluster model 702 models two main types of cluster domains: management server domain and peer domain. A cluster domain is a virtual collection of physical or logical elements that provide services to a client as a single unit.

Peer domain has no management node that manages all nodes in the cluster domain. Thus, each node in the domain is a peer and can access each other. Peer domain nodes are identical and there are no rankings between the nodes. Cluster operations may be run on any one of the nodes in the peer cluster domain. Examples of a peer domain include TSA, Veritas, and High Availability Cluster Multiprocessing for AIX 5L (HACMP) available from International Business Machines Corporation.

Management cluster domain, on the other hand, has one or more management nodes that manage peer nodes in the management server cluster domain. Peer nodes in the management cluster domain cannot access each other. All cluster operations are run by the management nodes. Examples of management server domain include WebSphere cluster and an open source project known as Extreme Cluster Administration Toolkit (xCat).

Figure 8:
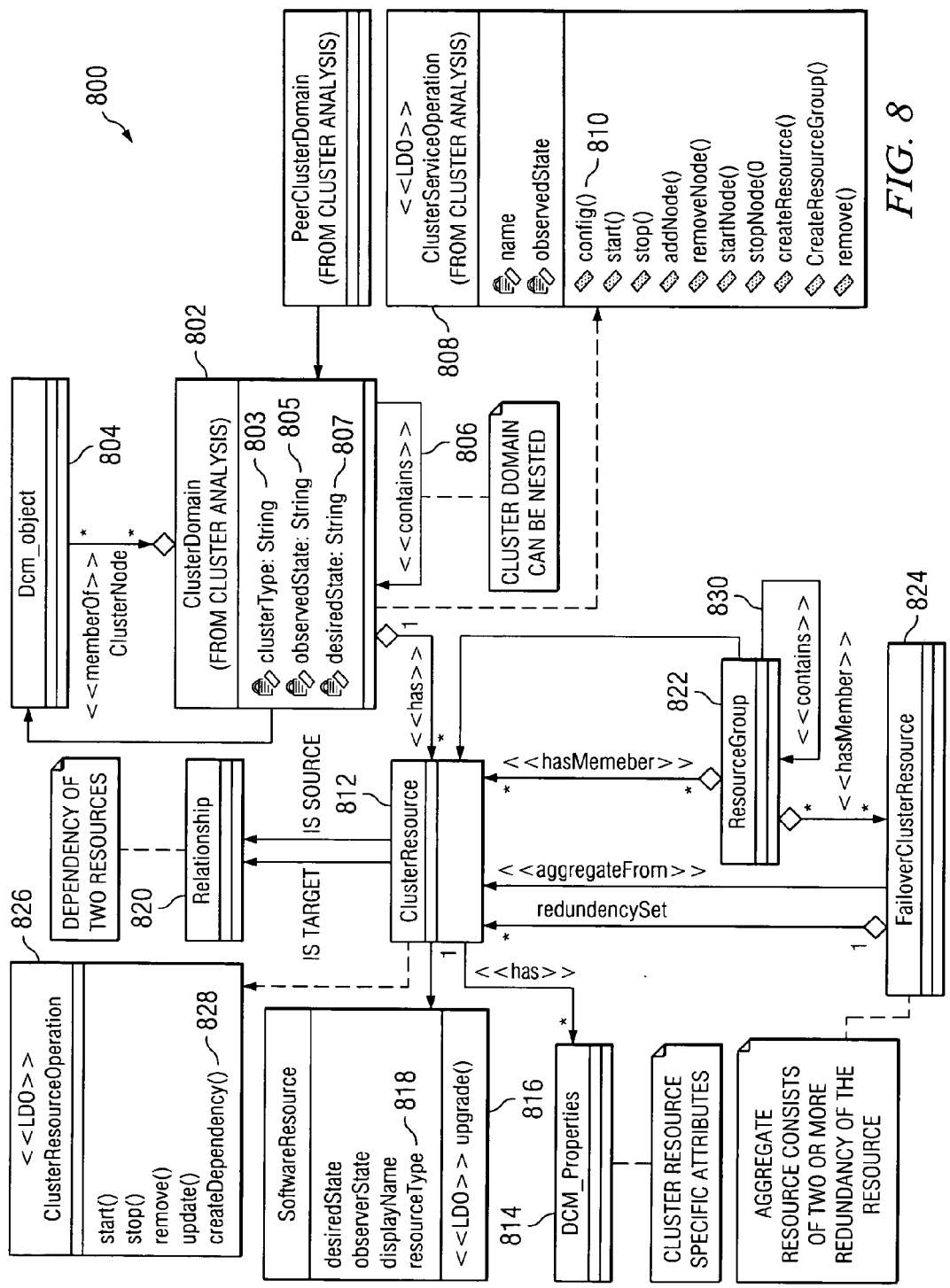
FIG. 8 is a diagram illustrating an exemplary common cluster domain model in accordance with an illustrative embodiment of the present invention.

Turning now to FIG. 8, a diagram illustrating an exemplary common cluster domain model is depicted in accordance with an illustrative embodiment of the present invention. As shown in FIG. 8, common cluster model 800 is able to handle both types of cluster domains. For example, cluster domain 802 includes logical elements known as cluster nodes, represented by Dcm_object 804. There may be one or more cluster node members in cluster domain 802. An application tier may specify associated cluster domain 802 used. Device driver or individual workflows may be associated with cluster domain 802 and software models may be associated with cluster domain 802 for configuring the cluster.

Cluster nodes, represented by Dcm_object 804, are logical representations of servers, such as H/A clusters, or software instances, such as WAS cluster, since a single system may be running two software instances simultaneously. Cluster node types 803 may be either a peer node or a management node if the cluster domain is management server domain. Common cluster model 800 provides the flexibility to support both types of clusters. For each cluster node, desired state 807 may be specified in order to determine what state cluster domain 802 should be after it is configured, for example, online. In addition, observed state 805 may also be specified, which indicates the current state of cluster domain 802, for example, offline.

In addition, cluster nodes in cluster domain 802 may be located in different physical systems, for example, a WAS cluster, or on a single system, for example, WAS 2-server instances running on a single machine. Furthermore, cluster domain 802 may be nested 806, meaning that a cluster domain may include one or more sub-cluster domains. However, a sub-cluster domain may only have exactly one parent cluster domain.

In order to configure, manage, and operate cluster domain 802, a set of cluster service operations 808 may be used. For example, config operation 810 may be used to lookup nodes belonging to a cluster domain and its existing resources and then define those resources. For each cluster domain 802, domain level cluster resources 812 and cluster domain properties 814 may be defined. These illustrative cluster service operations are also referred to as cluster domain operations.

In these illustrative examples, cluster resource 812 is a specialized software resource 816. Cluster resource 812 may be either a domain level cluster resource or node level cluster resource. Cluster resource 812 includes cluster resource type 818, desired state, observed state, and display name. Cluster resource type 818 may be an application, an IP, a share disk, etc. An example of an application is ipconfig.

Start/stop dependencies or relationships 820 may also be associated among cluster resources 812. For example, a dependency may be associated to resource A and resource B, which defines that resource A starts before resource B. Examples of resource dependencies include storage mappings and database instances. Each cluster resource 816 may include one or more resource attributes, represented by Dcm-properties 814. Examples of resource attributes include ip addresses, name masks, etc.

In addition, cluster resource 812 may be a member of resource group 822 or may be aggregated to form failover cluster resource 824, which consists of two or more redundancy of cluster resource 812, for a high availability cluster or a peer domain cluster. Just like cluster domain 802, resource group 822 may also associate with device driver or individual workflows. A set of cluster resource operations 826 may be used to configure, manage or operate cluster resource 812. For example, create dependency operation 828 may be used to create relationship 820 between two cluster resources.

Resource group 822 may be nested 830, meaning that a resource group may contain another resource group. However, each subgroup may only have exactly one parent group. Each resource group 822 may define group attributes and group dependencies among different cluster resource groups. These group attributes may be referred to as resource group properties. Each resource group 822 includes one or more cluster resources 812. These resources may be located in the same system or different systems. In addition, resource group 822 may also associate device driver and individual workflows. Furthermore, a set of cluster resource group logical operations can be used to operate resource group 822.

In order to map common cluster model 800 into a vendor specific data model, logical device operations, such as logical device operations 712 in FIG. 7, are used. As described above, common cluster model 800 provides cluster service operations 808 to map between common cluster domain 802 and vendor specific domain model. For each vendor specific clustering technology, a workflow implementation is provided and associated with logical device operations 712 in FIG. 7, and a mapping between common cluster model 800 and vendor specific domain mode is generated automatically.

For example, when config operation 810 in cluster service operations 808 is invoked, logical device operations 712 in FIG. 7 are invoked to parse a resource template to obtain vendor specific attributes for a cluster resource, and populate dcm_properties 814 for a cluster resource 812 in common cluster model 800. Thus, administrators may use cluster service operations 808 to configure, manage, and operate cluster domains and its associated resources.

Turning now to FIG. 9, a diagram illustrating exemplary cluster domain logical device operations and cluster resource logical device operations is depicted in accordance with an illustrative embodiment of the present invention. As shown in FIG. 9, cluster domain logical device operations 900 are provided by the present invention to configure, manage, and operate cluster domains. Cluster domain logical operations 900 include Config 902 for configuring a cluster domain, AddNode 904 that adds a cluster node to a cluster domain, Start 906 to start a cluster domain, Stop 908 to stop a cluster domain, StartNode 910 to start a node in a cluster domain, StopNode 912 to stop a node in a cluster domain, Remove 914 to remove a cluster domain, RemoveNode 916 to remove a node in a cluster domain, CreateResource 918 to create a cluster resource in a cluster domain, CreateResourceGroup 920 to create a resource group in a cluster domain, UpdateDomainStatus 922 to update a cluster domain observed state, and UpdateNodeStatus 924 to update a cluster node's observed state. These illustrative cluster domain logical operations may also be referred to as cluster domain operations.

Also shown in FIG. 9, cluster resource logical device operations 930 are provided by the present invention to configure, manage, and operate cluster resources within a cluster domain. Cluster resource logical device operations 930 include Start 932 to start a cluster resource, Stop 934 to stop a cluster resource, AddGroupMember 936 to add resources to a resource group, CreateDependency 938 to create dependencies between resources, Update 940 to update a cluster resource's attributes, and RemoveResource 942 to remove a cluster resource. These illustrative cluster resource logical operations may also be referred to as cluster resource operations.

Figure 10:
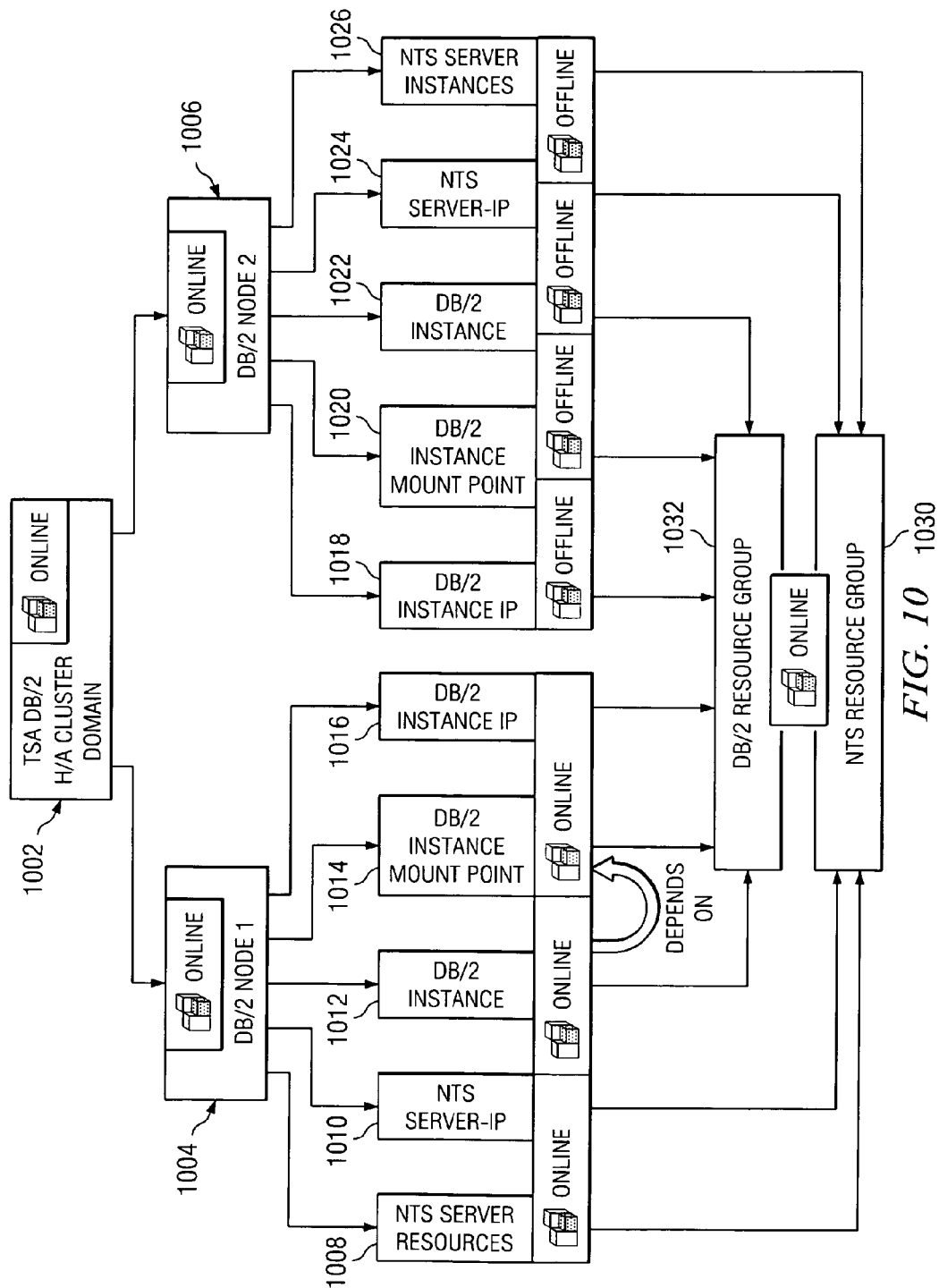
FIG. 10 is a diagram illustrating exemplary usage of common cluster model in FIG. 8 to model a high availability cluster in accordance with an illustrative embodiment of the present invention.

Turning now to FIG. 10, a diagram illustrating exemplary usage of common cluster model 800 in FIG. 8 to model a high availability cluster is depicted in accordance with an illustrative embodiment of the present invention. As shown in FIG. 10, TSA DB/2H/A cluster domain 1002 may be modeled as cluster domain 802 in FIG. 8.

TSA DB/2H/A cluster domain 1002 includes two cluster nodes: DB/2 Node 1 1004 and DB/2 Node 2 1006, which may be modeled using Dcm_object 804 in FIG. 8. In this example, DB/2 Node 1 1004 includes a number of resources accessible by a user. For example, nts server resources 1008, nts server IP 1010, DB/2 instance 1012, DB/2 Instance Mount Point 1014, and DB/2 Instance IP 1016. These resources are currently online.

A dependency may be defined between two resources. For example, DB/2 instance 1012 may depend on DB/2 Instance Mount Point 1014. Thus, DB2 instance 1012 may not start until after DB/2 Instance Mount Point 1014 is completed. This dependency may be modeled by using relationship 820 in FIG. 8.

Similar to DB/2 Node 1 1004, DB/2 Node 2 1006 also includes a number of resources, including DB/2 Instance IP 1018, DB/2 Instance Mount Point 1020, DB/2 Instance 1022, nts server IP 1024, and nts server resources 1026. However, unlike the resources in DB/2 Node 1 1004, these resources are offline or on standby. With cluster domain 900 and cluster resource logical device operations 930 in FIG. 9, administrator may use easily change the configuration of DB/2 Node 1 1004 and DB/2 Node 2 1006 to place these resources online.

Furthermore, resources from DB/2 Node 1 1004 and DB/2 Node 2 1006 may be grouped into a number of resource groups and placed online. For example, nts server resources 1008 and nts server IP 1010 from DB/2 Node 1 1004 and nts server IP 1024 and nts server resources 1026 from DB/2 Node 2 1006 may be grouped into nts resource group 1030, while DB/2 instance 1012, DB/2 Instance Mount Point 1014, DB/2 Instance IP 1016 from DB/2 Node 1 1004 and DB/2 Instance IP 1018, DB/2 Instance Mount Point 1020, and DB/2 Instance 1022 from DB/2 Node 2 1006 may be grouped into DB/2 resource group 1032. Nts resource group 1030 and DB/2 resource group 1032 may then be placed online using cluster resource logical device operations.

In summary, a common cluster model is provided by the present invention that understands vendor specific clustering technologies and its data model. Administrators may use the common cluster model and its logical device operations to configure, manage, and operate clusters, cluster nodes, and their resources without the knowledge of vendor specific clustering technologies. Administrators are no longer required to learn each vendor specific data model and operations in order to configure vendor specific clustering technologies. As a result, administrators may save significant time and efforts in configuring, managing, and operating clusters.

It is important to note that while the present invention has been described in the context of a fully functioning data processing system, those of ordinary skill in the art will appreciate that the processes of the present invention are capable of being distributed in the form of a computer usable medium of instructions and a variety of forms and that embodiments of the present invention applies equally regardless of the particular type of signal bearing media actually used to carry out the distribution. Examples of computer usable media include recordable-type media such a floppy disc, a hard disk drive, a RAM, and CD-ROMs and transmission-type media such as digital and analog communications links.

The description of the embodiments of the present invention have been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for a common cluster model for configuring, managing, and operating a plurality of different vendor specific clustering technologies in a data center, the method comprising:

defining a set of cluster domain operations and a set of cluster resource operations for a common cluster model interface of the common cluster model, wherein the set of cluster domain and resource operations operate on the plurality of different vendor specific clustering technologies;

associating a cluster resource with a first cluster domain including a cluster node and with a resource group with a set of resource group properties, wherein the first cluster domain uses a first vendor specific clustering technology;

populating a property of one of the first cluster domain and the cluster resource with vendor specific attributes of the first vendor specific clustering technology using a respective set of cluster domain operations and a respective set of cluster resource operations, wherein the respective set of cluster domain operations operates on the first cluster domain and the cluster node, and wherein the respective set of cluster resource operations operates on the cluster resource and the property; and associating individual and device driver workflows with one of the first cluster domain, the cluster resource, and the resource group, wherein the individual and device driver workflows interact with the different vendor specific clustering technologies.

2. The method of claim 1, wherein the first cluster domain is one of a peer cluster domain and a management server cluster domain, and wherein the cluster node is one of a server and a software instance.

3. The method of claim 1, wherein the first cluster domain includes a second cluster domain.

4. The method of claim 1, wherein the first cluster domain and the cluster node includes an observed state and a desired state, wherein the observed state indicates a current state.

5. The method of claim 1, wherein the cluster resource is a type of software resource, and wherein cluster resource includes a relationship to another cluster resource.

6. The method of claim 1, wherein the cluster resource is aggregated to form a failover cluster resource for a high availability cluster, wherein the failover cluster resource includes redundancy of the cluster resource.

7. The method of claim 1, wherein the resource group includes another resource group, and wherein the resource group depends on the another resource group.

8. The method of claim 1, wherein the cluster resource is located in one of a same data processing system and different data processing systems.

9. The method of claim 1, wherein the set of cluster domain operations includes a start operation, a stop operation, an add node operation, a remove node operation, a start node operation, a stop node operation, a create resource operation, a create resource group operation, an update domain status operation, and an update node status operation.

10. The method of claim 1, wherein the set of cluster resource operations include a start operation, a stop operation, an add group member operation, a create dependency operation, an update operation, and a remove resource operation.

11. A method in a data processing system for a common cluster model for configuring, managing, and operating a plurality of different vendor specific clustering technologies in a data center, the method comprising:

defining a set of cluster domain operations and a set of cluster resource operations for a common cluster model interface of the common cluster model, wherein the set of cluster domain and resource operations operate on the plurality of different vendor specific clustering technologies;

associating a cluster resource with a first cluster domain including a cluster node and with a resource group with a set of resource group properties, wherein the first cluster domain uses a first vendor specific clustering technology; and populating a property of one of the first cluster domain and the cluster resource with vendor specific attributes of the first vendor specific clustering technology using a respective set of cluster domain operations and a respective set of cluster resource operations, wherein the respective set of cluster domain operations operates on the first cluster domain and the cluster node, and wherein the respective set of cluster resource operations operates on the cluster resource and the property, wherein the set of cluster domain operations includes a config operation, wherein the config operation looks up the cluster node associated with the first cluster domain and a cluster resource associated with the cluster node.

12. A data processing system for configuring, managing, and operating a plurality of different vendor specific clustering technologies in a data center, comprising:
- a bus;
- a memory connected to a bus, wherein a set of instructions are located in the memory; and
- a processing unit connected to the bus, wherein the processing unit executes the set of instructions to:
  - define a set of cluster domain operations and a set of cluster resource operations for a common cluster model interface, wherein the set of cluster domain and resource operations operate on the plurality of different vendor specific clustering technologies;
  - associate a cluster resource with a first cluster domain including a cluster node and with a resource group with a set of resource group properties, wherein the first cluster domain uses a first vendor specific clustering technology;
  - populate a property of one of the first cluster domain and the cluster resource with vendor specific attributes of the first vendor specific clustering technology using a respective set of cluster domain operations and a respective set of cluster resource operations, wherein the respective set of cluster domain operations operates on the first cluster domain and the cluster node, and wherein the respective set of cluster resource operations operates on the cluster resource and the property; and
  - associate individual and device driver workflows with one of the first cluster domain, the cluster resource, and the resource group, wherein the individual and device driver workflows interact with the different vendor specific clustering technologies.

13. The system of claim 12, wherein the first cluster domain is one of a peer cluster domain and a management server cluster domain, and wherein the cluster node is one of a server and a software instance.

14. A computer program product comprising computer executable instructions embodied in a computer usable non-transitory storage medium for configuring, managing, and operating a plurality of different vendor specific clustering technologies in a data center, the computer program product comprising:
- first instructions for defining a set of cluster domain operations and a set of cluster resource operations for a common cluster model interface, wherein the set of cluster domain and resource operations operate on the plurality of different vendor specific clustering technologies;
- fourth instructions for associating a cluster resource with a first cluster domain including a cluster node and with a resource group with a set of resource group properties, wherein the first cluster domain uses a first vendor specific clustering technology;
- fifth instructions for populating a property of one of the first cluster domain and the cluster resource with vendor specific attributes of the first vendor specific clustering technology using a respective set of cluster domain operations and a respective set of cluster resource operations, wherein the respective set of cluster domain operations operates on the first cluster domain and the cluster node, and wherein the respective set of cluster resource operations operates on the cluster resource and the property; and
- sixth instructions for associating individual and device driver workflows with one of the first cluster domain, the cluster resource, and the resource group, wherein the individual and device driver workflows interact with the different vendor specific clustering technologies.

15. The computer program product of claim 14, wherein the first cluster domain is one of a peer cluster domain and a management server cluster domain, and wherein the cluster node is one of a server and a software instance.

* * * * *